United States Patent [19]

Saito

[11] Patent Number: 5,191,507

[45] Date of Patent: Mar. 2, 1993

[54] POLARITY INVERTING CIRCUIT

[75] Inventor: Koichi Saito, Tokyo, Japan

[73] Assignee: NEC Corporation, Tokyo, Japan

[21] Appl. No.: 634,432

[22] Filed: Dec. 27, 1990

[30] Foreign Application Priority Data

Dec. 29, 1989 [JP] Japan .................................. 1-342877

[51] Int. Cl.⁵ ........................................... H03K 17/66
[52] U.S. Cl. .................................. 361/245; 307/127; 320/26
[58] Field of Search .................... 320/25, 26; 307/127, 307/151; 361/245, 246; 318/293, 294, 280, 287, 289; 178/16; 379/240; 246/256

[56] References Cited

U.S. PATENT DOCUMENTS 4,071,879 1/1978 Falk ..................................... 361/245

FOREIGN PATENT DOCUMENTS 2038118 7/1980 United Kingdom ................ 318/280

Primary Examiner—Jeffrey A. Gaffin
Assistant Examiner—Fritz M. Fleming

[57] ABSTRACT

A polarity inverting circuit includes first and second output voltage transmission circuits, first and second connection circuits, first and second polarity switching time changing circuits, and a controller. The first output voltage transmission circuit is connected to a first signal line to linearly change an output voltage from a first potential to a second potential. The second output voltage transmission circuit is connected to a second signal line to linearly change an output voltage from the second potential to the first potential when an output voltage from the first output voltage transmission circuit reaches the second potential. The first connection circuit connects the first signal line to a second potential source when the output from the first output voltage transmission circuit reaches the second potential. The second connection circuit disconnects the second signal from the second potential source when the first connection circuit is connected to the second potential source. The first and second polarity switching time changing circuits are respectively connected to the first and second output voltage transmission circuits to change rates of changes in output voltage. The controller controls operations of the respective circuits.

5 Claims, 3 Drawing Sheets

POLARITY INVERTING CIRCUIT

BACKGROUND OF THE INVENTION

The present invention relates to a polarity inverting circuit for transmitting battery and ground signals to two signal lines and, more particularly, to a polarity inverting circuit used for an analog trunk of a telephone exchange.

As a conventional means for performing polarity inversion of battery and ground signals of this type, a relay or a semiconductor element as a substitute for a relay has been used.

FIG. 3 shows a conventional polarity inverting circuit.

Referring to FIG. 3, leads R and T constitute a bidirectional speech channel connected to an exchange and also serve as signal lines for transmitting battery and ground signals to a calling office. A 4W/2W converter 8 converts two-wire bidirectional speech signals from an external line side into four-wire unidirectional speech signals.

In an open state, a battery signal (−48 V) and a ground signal (G) are respectively transmitted to the lines R and T, as shown in FIG. 3. A seizing signal is transmitted from the calling exchange by using the lines R and T as a loop. Subsequently, dial pulses are transmitted by loop disconnection. The dial pulses are detected by a loop detector 9. An exchange processing is performed in accordance with a received number so as to call a corresponding subscriber. When the subscriber responds to this call, an RV relay is operated by software control. As a result, the polarities of the battery and ground signals, which have been transmitted to the lines R and T, are inverted, and an answer signal is transmitted to the exchange.

When a metering pulse signal is supplied, inversion signals are transmitted to the exchange at time intervals corresponding to the distance between a calling subscriber and a called subscriber, e.g., intervals of 150 ms.

In the above-described conventional polarity inverting circuit for battery and ground signals, since a relay or the like is used to transmit a called subscriber response signal to the exchange or to transmit a metering pulse signal during speech communication by simply switching polarities, large noise is generated in every switching operation. Such noise tends to influence a speech circuit and other devices of the exchange.

If an LC circuit consisting of an inductance L and a capacitor C is inserted to suppress noise generated upon polarity inversion, a low-current time (output voltage drop time) in polarity inversion is prolonged, some exchange may erroneously detect such a state as an open state (battery/ground signal supply interruption), and speech communication may be abruptly interrupted. In addition, since large inductance and capacitor are required, a large mounting space is required.

SUMMARY OF THE INVENTION

It is an object of the present invention to provide a polarity inverting circuit which can stably and efficiently invert and switch the polarities of battery and ground signals in accordance with an interface condition with respect to a corresponding unit without influencing speech paths.

In order to achieve the above object, according to the present invention, there is provided a polarity inverting circuit for supplying one of first and second potentials to first and second signal lines in accordance with a polarity inversion control signal, comprising first output voltage transmission means, connected to the first signal line, for linearly changing an output voltage from the first potential to the second potential, second output voltage transmission means, connected to the second signal line, for linearly changing an output voltage from the second potential to the first potential when an output voltage from the first output voltage transmission means reaches the second potential, first connection means for connecting the first signal line to a second potential source when the output from the first output voltage transmission means substantially reaches the second potential, second connection means for disconnecting the second signal from the second potential source when the first connection means is connected to the second potential source, first and second polarity switching time changing means, connected to the first and second output voltage transmission means, for changing corresponding rates of changes in output voltage, and control means for controlling operations of the first and second output voltage transmission means and of the first and second connection means.

DESCRIPTION OF THE PREFERRED EMBODIMENT

Figure 1:
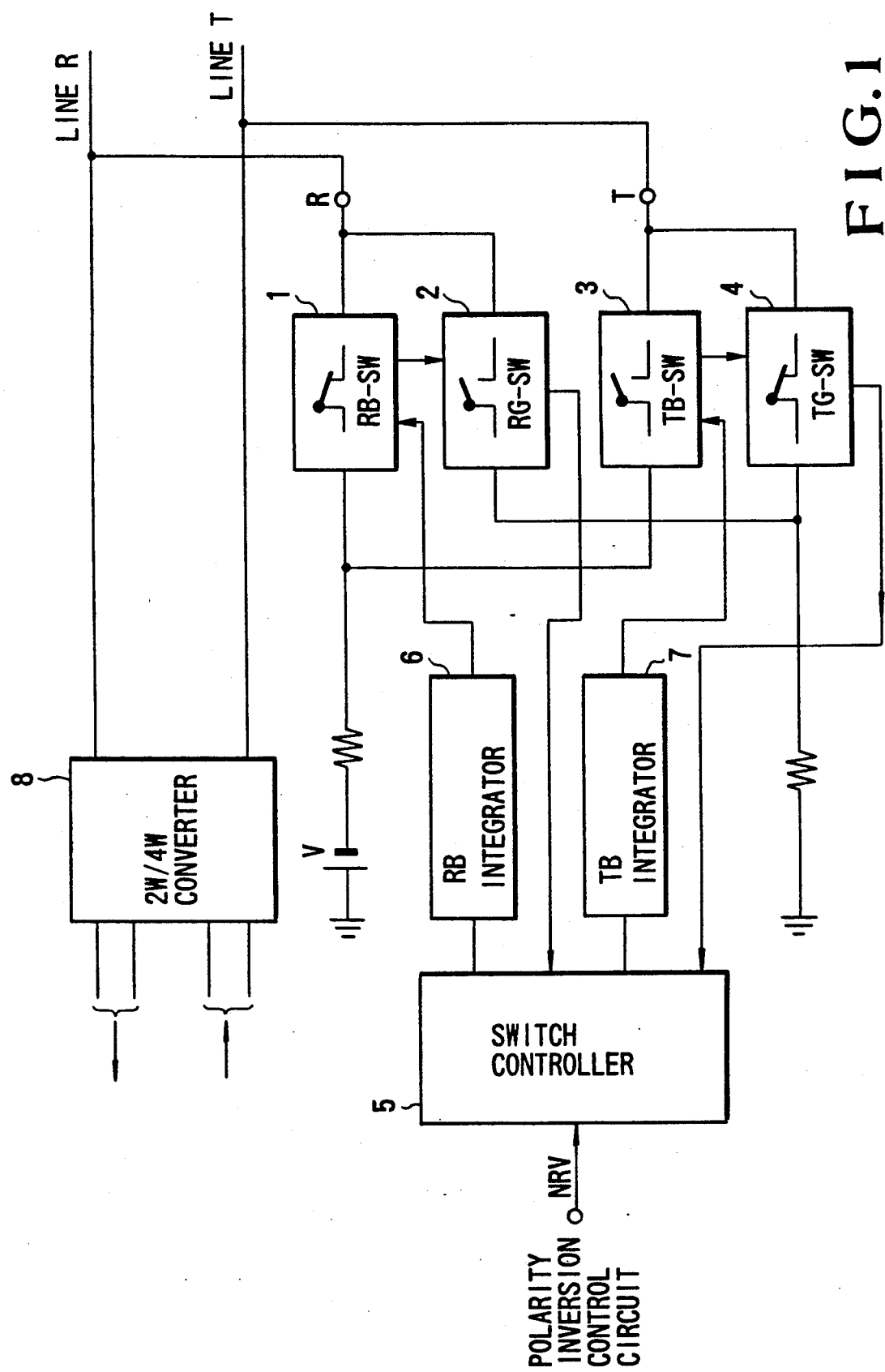
FIG. 1 is a block diagram showing a polarity inverting circuit of a trunk according to an embodiment of the present invention.

An embodiment of the present invention will be described below with reference to the accompanying drawings.

A battery signal transmission/interruption switch circuit (RB-SW) 1 and a ground signal transmission/interruption switch circuit (RG-SW) 2 are connected to a line R. A battery signal transmission/interruption switch circuit (TB-SW) 3 and a ground signal transmission/interruption switch circuit (TG-SW) 4 are connected to a line T. In addition, the RB-SW 1 is connected to a switch controller 5 through an RB integrator 6 for determining a switching timing of the switch circuit. Similarly, the TB-SW 3 is connected to the switch controller 5 through a TB integrator 7.

In a normal state (when a polarity inversion control signal NRV is in an OFF state), the RB-SW 1 and the TG-SW 4 are in an ON state, and the RG-SW 2 and the TB-SW 3 are in an OFF state, so that battery and ground signals are respectively transmitted to the lines R and T.

An operation of the polarity inverting circuit will be described below with reference to a timing chart shown in FIG. 2. When the polarity inversion control signal NRV is enabled, an output voltage from the RB-SW 1 is linearly changed from −48 V to ground level by the RB integrator 6. When the output terminal of the RB-SW 1 is switched to ground level (high impedance in practice), the RG-SW 2, which has been in an OFF state, is turned on, and a ground signal G is transmitted to the line R. When the switch controller 5 detects that the RG-SW 2 is turned on, it transmits a switching signal to the TB integrator 7. An output voltage from TB-SW 3 is linearly changed from G level to −48 V by the integrator 7. At the same time, the TG-SW 4 is turned off upon control of the TB-SW 3 so as to open the output terminal of the TG-SW 4. With this operation, the polarities of the lines R and T are changed from −48 V at line R and G at line T to G at line R and −48 V at line T.

When the polarity inversion control signal is disabled, the switch controller 5 controls TB-SW 3 through the TB integrator 7 so as to change the level of the output terminal of the TB-SW 3 from −48 V to ground level and to eventually set it in an open state (high impedance). When the output terminal of the TB-SW 3 approaches an open state, the TB-SW 4 is turned on by a control signal from the TB-SW 3, and the ground signal G is transmitted to the line T. When the switch controller 5 detects that the output of the line T is −48 V transmission TB-SW 3 is set near an open state, the switch controller 5 linearly changes the output of the line R which is −48 V transmission RB-SW 1 is set from an open state (ground level) to −48 V by the RB integrator 6. At the same time, when the level of the output terminal of the RB-SW 1 approaches −48 V, the controller 5 turns off the line R due to the ground signal G transmission by RG-SW 2. As a result, the output terminal of RG-SW 2 is set in an open state. With this operation, the polarities of the lines R and T are switched from G at line R and −48 V at line T to −48 V at line R and to G at line T, respectively.

Figure 2:
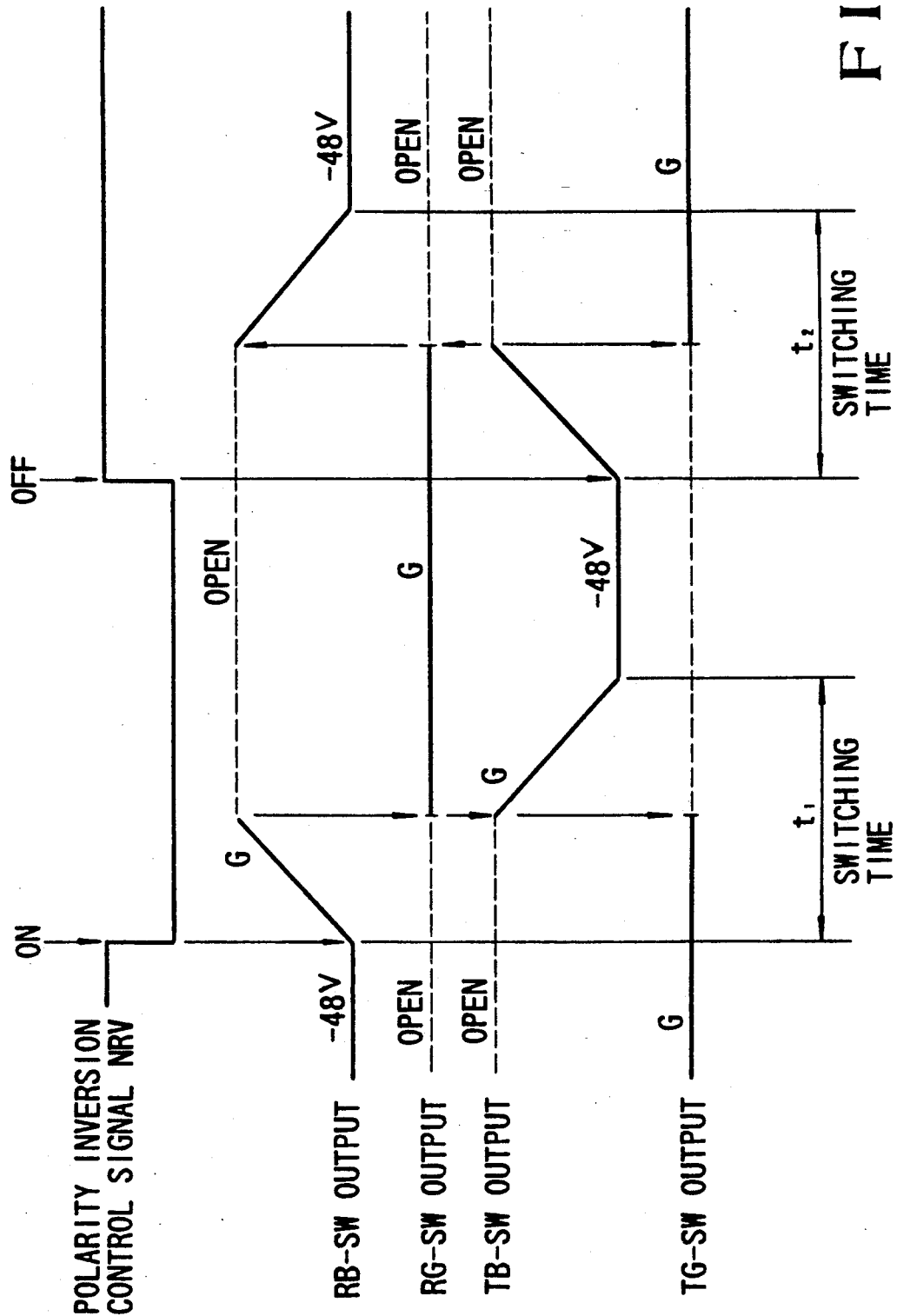
FIG. 2 is a timing chart of outputs from the circuit in FIG. 1.
Figure 3:
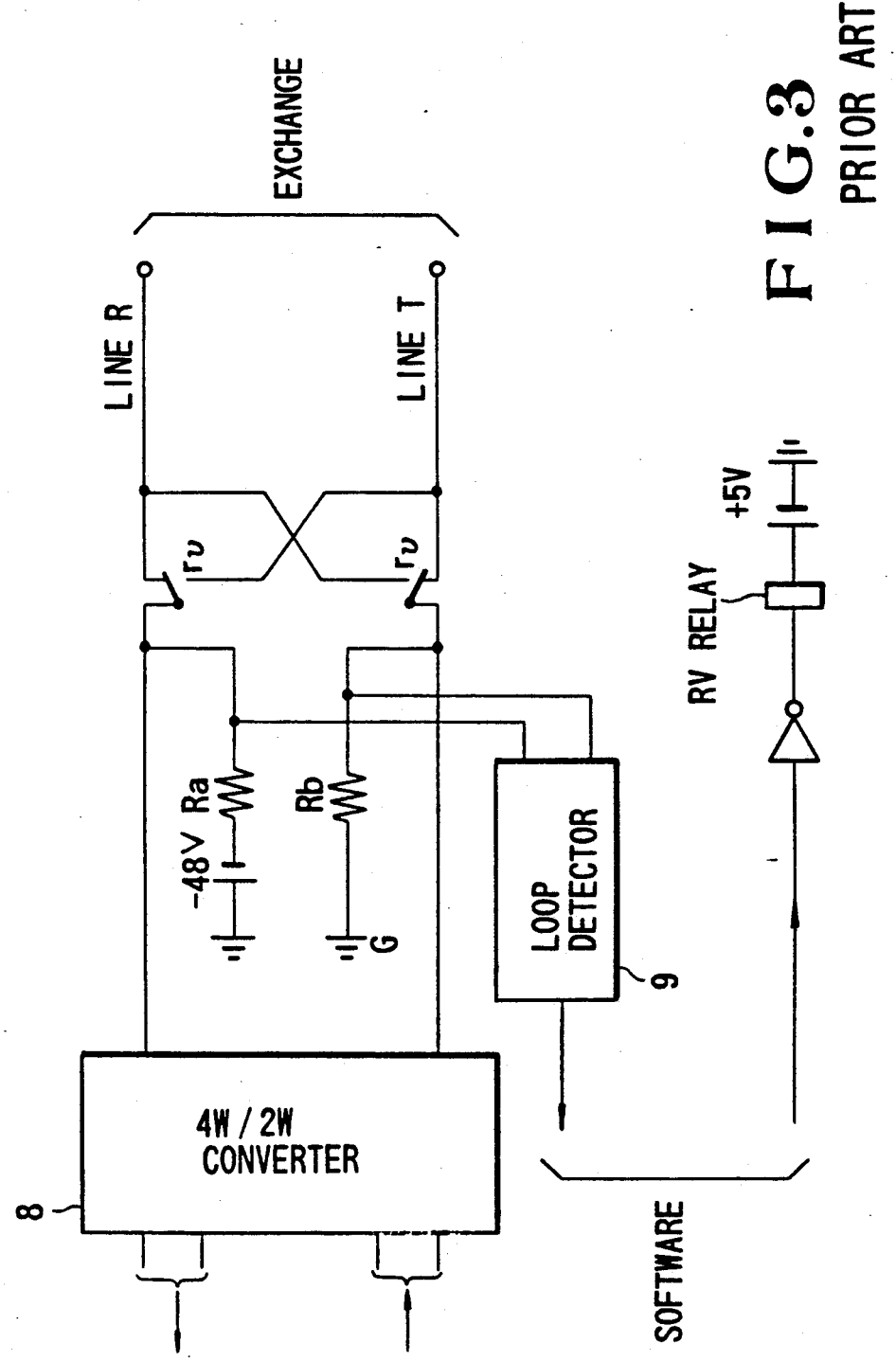
FIG. 3 is a schematic view showing a conventional polarity inverting circuit of a trunk.

As shown in FIG. 2, the waveforms of outputs of RB-SW 1 at line R and of TB-SW 3 at line T are linearly changed by the RB integrator 6 and the TB integrator 7, respectively. The output voltages are smoothly changed in this manner to minimize noise generated upon polarity inversion.

Referring to FIG. 2, a polarity inversion time interval $t_1$ between the instant at which a polarity inversion control signal ON is received and the instant at which −48 V is output to the line T can be changed by changing the constant of the RB integrator 6 in FIG. 1. If the switching time is prolonged, noise generated upon polarity inversion can be suppressed. However, the time interval in which a voltage applied between the lines R and T is kept to be a value near 0 V (open state) is prolonged. This may adversely affect the exchange. For this reason, an optimal switching time must be set in consideration of an interface condition with respect to the exchange.

The above description associated with the time interval $t_1$ is equally applied to a polarity inversion time interval $t_2$ between the instant at which a polarity inversion control signal OFF is received and the instant at which −48 V is output to the line R.

As has been described above, according to the present invention, polarity inversion of battery and ground signals transmitted to a speech channel is performed by linearly increasing/decreasing an output voltage, and changing the rate of change in output voltage regardless of a load state. Therefore, the polarities of battery and ground signals can be stably and efficiently inverted/switched in accordance with an interface condition with respect to a corresponding unit without influencing speech paths.

What is claimed is:

1. A polarity inverting circuit for supplying one of first and second potentials to first and second signal lines in accordance with a polarity inversion control signal, the circuit comprising:
    a first potential source and a second potential source;
    first output voltage transmission means (RB-SW1) connected to said first potential source and to said first signal line for linearly changing an output voltage from the first potential to the second potential;
    second output voltage transmission means (TB-SW 3) connected to said second signal line for linearly changing an output voltage from the second potential to the first potential when the output voltage from said first output voltage transmission means reaches the second potential;
    first connection means (RG-SW 2) connected to said first signal line and operated for connecting said first signal line to said second potential source when the output voltage from said first output voltage transmission means substantially reaches the second potential;
    second connection means (TG-SW 4) connected to said second signal line and operated for disconnecting said second signal line from said second potential source when said first connection means is connected to said second potential source;
    first and second polarity switching time changing means, (6,7) connected to said first and second output voltage transmission means, respectively, for changing corresponding rates of changes in the respective output voltages; and
    control means (5) connected to said first and second polarity switching time changing means and to said first and second connection means, said control means receiving a polarity inversion control signal and controlling operations of said first and second output voltage transmission means and of said first and second connection means.

2. A circuit according to claim 1, wherein the first potential is −48 V and the second potential is a ground potential.

3. A circuit according to claim 1, wherein said control means is constructed so that it controls said second polarity switching time changing means (7) to linearly change the output voltage from said second output voltage transmission means (TB-SW 3) from the first potential to the second potential when a state of the polarity inversion control signal is changed,
    controls said second connection means (TG-SW 4) to connect said second signal line to said second potential source when said output voltage from said second output voltage transmission means substantially reaches the second potential,
    controls said first polarity switching time changing means (6) to linearly change the output from said first output voltage transmission means (RB-SW 1) from the second potential to the first potential when the output voltage from said second output voltage transmission means (TB-SW 3) substantially becomes the second potential, and
    controls said first connection means (RG-SW 2) to disconnect said first signal line from said first potential source when the output voltage from said first output voltage transmission means (RBJ-SW 1) substantially becomes the first potential.

4. A circuit according to claim 1, wherein said first output voltage transmission means (RB-SW1) is a battery signal transmission/interruption switch circuit, said second output voltage transmission means (TB-SW3) is a battery signal transmission/interruption switch circuit, said first connection means (RG-SW2) is a ground signal transmission/interruption switch circuit and said second connection means (TG-SW4) is a ground signal transmission/interruption switch circuit.

5. A circuit according to claim 4, wherein said first and second polarity switching time changing means (6,7) each includes an integrator circuit.

* * * * *